A. L. JONES.
Improvement in Steam-Traps.
No. 128,887.          Patented July 9, 1872.
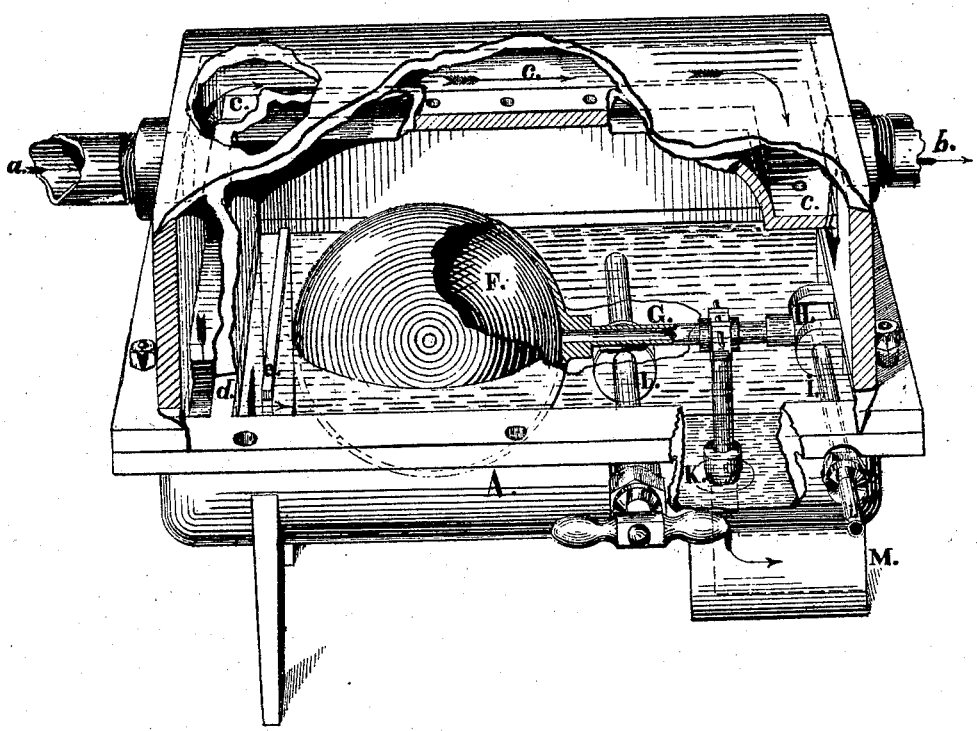
WITNESSES.
INVENTOR.

UNITED STATES PATENT OFFICE.

ALONZO L. JONES, OF PHILADELPHIA, PENNSYLVANIA.

IMPROVEMENT IN STEAM-TRAPS.

Specification forming part of Letters Patent No. 128,887, dated July 9, 1872.

SPECIFICATION.

I, ALONZO L. JONES, of Philadelphia, in the county of Philadelphia and State of Pennsylvania, have invented certain Improvements in Steam-Traps, of which the following is a specification:

*Nature and Objects of the Invention.*

The first part of my invention relates to the construction of a steam-trap, consisting of a ball-float acting by a lever upon a valve, so that the float may exert a greater lifting force than by its displacement alone it could, the whole being inclosed in a case; the object of this part of my invention being to open a large valve against pressure, and discharge a sufficient quantity of water with a float of practicable size, instead of one many times larger, as has been formerly required. The second part of my invention relates to the passing of the current of steam through the trap clear of the water, preserving an even surface of water in which the float shall rest, and emptying the trap of its contents upon occasion. The third part of my invention relates to the combination, with a ball-float in a steam-trap or elsewhere, under steam-pressure, of a tube opening into the float, and thence into the outer air, so that any water leaking into the float will be evaporated and the float kept empty; the object of this part of my invention being to prevent the float from filling with water by leakage and so losing its lifting power.

*Description of the Accompanying Drawing.*

The drawing is a perspective view of a machine embodying my invention, broken away to show its interior.

*General Description.*

A is the case in which the apparatus is inclosed, made strong enough to resist steam-pressure, and having, at its ends, near the top, the openings a b—a being for the inlet and b for the outlet of the steam, unless it is not desired to carry the steam further, in which case b is plugged. C is a conduit extending from a to b for the passage of the steam clear of the water with which the trap will be partly filled. In the bottom of the conduit are small holes by which any water which passes through with the steam will escape, and through which the steam-pressure will act upon the large chamber of the trap. d is a partition extending across the whole case, except an opening at the bottom, through which the water passes. e is a bridge extending across the case, and rising some distance above the water-line. The water held between d and e will form a gate and compel the passage of the current of steam through the conduit c. A small hole at the bottom of e will drain the trap when the valve is held open. F is a ball-float attached to the hollow lever G, which opens into it, and which at its other end opens into the hollow axis H, which works in bearings. I is a small tube, also opening into the axis H, and extending through the stuffing-box i into the open air. K is a valve attached by its stem to the lever. L is a cam whose journal passes through a stuffing-box in the side of the case, and which, being turned upward, will open the valve K by the lever G and allow the contents of the trap to escape. M is the waste for the water.

When steam is turned on, passing into or through the trap, as may be, the valve will remain closed until the water of condensation has accumulated so as to lift the float, when the valve will be opened and will prevent the water from rising above that point, but discharging no steam. The float, by the leverage which it has, will raise a much larger valve and thus discharge more water, if required, than otherwise it would be able to do. The water passing under the partition d and over the bridge e will flow quietly into the chamber in which is the float, which will rest in still water and work steadily. The steam passing through the conduit c will be more dry than if passed directly over the water in the trap, and will not derange the action of the float.

If the trap is to be placed at the end of a line of piping and it is not intended to carry steam through it, the partition and bridge d and e and the conduit c may be dispensed with, a guard being placed in front of the opening a to steady the water.

If, when steam is not on, there is danger of the trap freezing, or if it be desired to blow out the pipes through the trap, the valve may be raised and held open by turning the cam L, and the contents of the trap will escape.

If any water shall leak into the float, (which it is impossible entirely to prevent,) there being a clear passage through the hollow lever G, the axis H, and the tube I into the outer air, and there being no more than atmospheric pressure within the float, such water will be immediately evaporated by the heat of the steam, and the float will always be empty and always have its full lifting power.

Claims.

I do not claim a steam-trap in which a valve is raised by the direct action of a ball-float, as I am aware that such have been heretofore used; but

I claim as my invention in a steam-trap—

1. In combination with a ball-float and its hollow stem, the tube I, constructed and operating substantially as described.

2. In combination with the ball-float F and valve K, the lever G, constructed and operating substantially as described.

3. In combination with the valve K the cam L, with its journal extending without the case, constructed and operating substantially as described.

4. The combination of the partition d, bridge e, and conduit C, whereby the steam is separated from the water in its passage through the trap, constructed and operating substantially as described.

ALONZO L. JONES.

Witnesses:
 G. MORGAN ELDRIDGE,
 JACOB W. SATTERTHWAIT.